United States Patent
Gu et al.

(10) Patent No.: US 7,468,943 B2
(45) Date of Patent: Dec. 23, 2008

(54) TRANSMISSION/RECEPTION APPARATUS AND METHOD IN A MOBILE COMMUNICATION SYSTEM

(75) Inventors: Young-Mo Gu, Seongnam-si (KR); Min-Goo Kim, Yongin-si (KR); Soon-Jae Choi, Yongin-si (KR)

(73) Assignee: Samsung Electronics, Co., Ltd., Suwon-Si (KR)

( * ) Notice: Subject to any disclaimer, the term of this patent is extended or adjusted under 35 U.S.C. 154(b) by 770 days.

(21) Appl. No.: 11/003,338

(22) Filed: Dec. 6, 2004

(65) Prior Publication Data

US 2005/0128934 A1 Jun. 16, 2005

(30) Foreign Application Priority Data

Dec. 15, 2003 (KR) .................. 10-2003-0091435

(51) Int. Cl.
*H04J 11/00* (2006.01)
(52) U.S. Cl. ............................................ 370/203
(58) Field of Classification Search ......... 370/203–210, 370/310, 328, 342; 375/130–132, 138
See application file for complete search history.

(56) References Cited

U.S. PATENT DOCUMENTS 5,757,846 A * 5/1998 Vasudevan .............. 375/130
7,177,297 B2 * 2/2007 Agrawal et al. .......... 370/342
7,242,722 B2 * 7/2007 Krauss et al. ............. 375/260
7,280,467 B2 * 10/2007 Smee et al. ............... 370/208
2002/0191568 A1 * 12/2002 Ghosh ..................... 370/335
2003/0072254 A1 4/2003 Ma et al.
2003/0072255 A1 4/2003 Ma et al.

FOREIGN PATENT DOCUMENTS

| KR | 1020020075569 | 10/2002 |
| KR | 1020040110904 | 12/2004 |
| KR | 1020050040058 | 5/2005 |

* cited by examiner

*Primary Examiner*—Dmitry Levitan
(74) *Attorney, Agent, or Firm*—Roylance, Abrams, Berdo & Goodman, LLP

(57) ABSTRACT

Disclosed is a transmission/reception apparatus and method for providing compatibility between Code Division Multiple Access (CDMA) and Orthogonal Frequency Division Multiplexing (OFDM) in a forward link. The proposed transmission/reception apparatus and method uses a traffic channel based on OFDM while using a pilot channel and a sync channel used in the CDMA scheme. Thus, a transmitter adds a pilot channel signal and a sync channel signal to OFDM-modulated symbols before transmission, and a receiver acquires a pilot channel signal and a sync channel signal, and removes them from a received signal, thereby outputting only pure OFDM-modulated symbols.

21 Claims, 5 Drawing Sheets

TRANSMISSION/RECEPTION APPARATUS AND METHOD IN A MOBILE COMMUNICATION SYSTEM

PRIORITY

This application claims the benefit under 35 U.S.C. § 119 (a) to an application entitled "Transmission/Reception Apparatus and Method in a Mobile Communication System" filed in the Korean Intellectual Property Office on Dec. 15, 2003 and assigned Serial No. 2003-91435, the entire contents of which are incorporated herein by reference.

BACKGROUND OF THE INVENTION

1. Field of the Invention

The present invention relates generally to a transmission/reception apparatus and method in a mobile communication system. In particular, the present invention relates to a transmission/reception apparatus and method for providing compatibility between Code Division Multiple Access (CDMA) and Orthogonal Frequency Division Multiplexing (OFDM) in a forward link.

2. Description of the Related Art

In general, Code Division Multiple Access (CDMA) mobile communication systems, which are divided into synchronous systems and asynchronous systems, provide services using various channels. Channels used in the CDMA mobile communication system are divided into forward channels formed in a direction from a base station to a mobile station and reverse channels formed in a direction from a mobile station to a base station. The forward channels include a pilot channel, a sync channel, a traffic channel, etc.

The existing synchronous CDMA mobile communication standard specifies that N Walsh codes generated using an N×N Hadamard matrix are used as channelization codes for a forward link. For example, for a physical channel defined in a $2^{nd}$ generation (2G) CDMA mobile communication (IS-95A/B) standard, which is incorporated herein by reference, a total of N=64 Walsh codes are used. Of the 64 Walsh codes, a code $W_0[1 \ldots 1]$ is used for spreading a pilot channel, a code $W_{N/2}=[1 \ldots 1-1 \ldots -1]$ is used for spreading a sync channel, and the remaining codes are used for spreading traffic channels. Such a CDMA technique is equally used in most of the conventional CDMA mobile communication systems for the following reasons. The next generation synchronous CDMA mobile communication standard is specified in $3^{rd}$ Generation Partnership Project 2 (3GPP2), a synchronous CDMA standardization organization, such that it maintains compatibility with IS-95A/B. Therefore, the forward channels should include the pilot channel and the sync channel. The pilot channel is defined in the standard such that with the use of the pilot channel, a mobile station identifies a base station and performs major CDMA functions such as initial synchronization and soft handover. The sync channel supports a function of synchronizing a system time between a mobile station and a base station such that each base station can operate on a synchronous basis. Thus, the sync channel is necessary for CDMA communication. Conventionally, the base station and the mobile station are synchronized with each other through the pilot channel and the sync channel, and thereafter, a voice service and a data service are provided through given Walsh codes and traffic channels.

FIG. 1 is a block diagram illustrating a structure of a transmitter in a conventional CDMA mobile communication system. Referring to FIG. 1, a pilot signal generated by a pilot signal generator 110 for power control is spread in a multiplier 112 by a channelization code for detecting a pilot channel. Commonly, a $0^{th}$ Walsh code $W_0$ is used as a channelization code for detecting the pilot channel. The pilot signal is defined in the standard such that with the use of the pilot signal, a mobile station identifies a base station and performs major CDMA functions such as initial synchronization and soft handover as well as power control. The pilot channel signal spread by the channelization code is scrambled in a multiplier 114 by a pseudo-random noise (PN) sequence for detecting a base station. A sync signal generated by a sync signal generator 120 for synchronization between a base station and a mobile station is spread in a multiplier 122 by a channelization code for detecting a sync channel. Commonly, an $(N/2)^{th}$ Walsh code $W_{N/2}$ is used as a channelization code for detecting the sync channel. Here, N denotes the total number of Walsh codes used in the CDMA mobile communication system. For example, when N=64 Walsh codes are used, a $32^{nd}$ Walsh code $W_{32}$ is used to distinguish the sync channel. The sync channel signal spread by the channelization code is scrambled in a multiplier 124 by the PN sequence. A traffic signal for transmitting data is generated by a traffic data generator 130, and is spread in a multiplier 132 by any one of the remaining channelization codes except the channelization codes allocated to the pilot channel and the sync channel. Walsh codes $W_i(i=1,2,\ldots,N/2-1, N/2+1,\ldots,N-1)$ can be allocated as channelization codes for the traffic channels. The traffic channel signal spread by the channelization code is scrambled in a multiplier 134 by the PN sequence. Although only one traffic channel is shown in FIG. 1, it should be obvious that a plurality of traffic channels can be used. The pilot channel signal, sync channel signal, and traffic channel signal, all of which were scrambled by the PN sequence, are summed up into one signal in a summer 140. The summed signal is modulated by a modulator 150.

As described above, in the common CDMA mobile communication system, channelization codes for the necessary forward channels are fixed, and the remaining channelization codes are used for transmitting data. That is, in the existing CDMA scheme, a unique Walsh code is allocated to each traffic channel. For example, for a forward fundamental channel (F-FCH), a forward supplemental channel (F-SCH) and a forward packet data channel (F-PDCH), each base station allocates Walsh codes determined by channel resources available at a particular time to each mobile station, and the traffic channels are orthogonally spread by the allocated Walsh codes before being transmitted.

For a high-speed wireless multimedia service targeted by the next generation mobile communication system, wideband spectrum resources are required. However, when wideband spectrum resources are used, fading effects on a wireless transmission path caused by multipath propagation are prominent, and frequency selective fading can be observed even within a transmission band. Therefore, for high-speed wireless multimedia service, an OFDM scheme which is robust against frequency selective fading is superior to a CDMA scheme which uses a spreading gain having a PN sequence and a Walsh code. Thus, currently, active research is being performed on the OFDM scheme and an Orthogonal Frequency Division Multiple Access (OFDMA) scheme using the same.

Generally, the OFDM scheme has excellent spectrum efficiency because spectrums of subchannels are overlapping each other, maintaining mutual orthogonality. In the OFDM scheme, modulation is implemented by Inverse Fast Fourier Transform (IFFT) and demodulation is implemented by Fast Fourier Transform (FFT). As a multiple access scheme based on the OFDM scheme, there is an Orthogonal Frequency Division Multiple Access (OFDMA) scheme in which some of all subcarriers are allocated to a particular user. The OFDMA scheme does not require a spreading sequence for spreading. The OFDMA scheme can dynamically change a set of subcarriers allocated to a particular user according to a fading characteristic of a wireless transmission path, and this is commonly called "dynamic resource allocation" or "frequency hopping."

Meanwhile, as a multiple access scheme requiring a spreading sequence, there are a spreading-in-time-domain scheme and a spreading-in-frequency-domain scheme. The spreading-in-time-domain scheme spreads a user signal in a time domain, and then maps the spread signal to a subcarrier. The spreading-in-frequency-domain scheme demultiplexes a user signal in a time domain, maps the demultiplexed signal to a subcarrier, and distinguishes the user signal using an orthogonal sequence in a frequency domain.

However, in an environment where the existing synchronous CDMA transmission standard is being extensively serviced, a new standard based on OFDMA has many problems. That is, in a cellular network of FIG. 6 where cells supporting OFDMA technology coexist with cells supporting CDMA technology, service continuity may not be guaranteed due to handover between cells supporting different communication technologies. Therefore, research is being carried out on a method for grafting OFDMA to the existing synchronous CDMA transmission standard. Research is also being performed to show that OFDMA is higher than CDMA in gain. In order to design the new standard, there is a demand for an optimal grafting method of integrating OFDMA into a CDMA system, maintaining cell planning using a pilot channel supporting the existing cellular mobile communication system.

As described above, the OFDMA scheme is a combined multiple access scheme of frequency division and time division, and is advantageous in that it is robust against multipath fading and has excellent frequency efficiency. If the OFDMA system having the foregoing advantages is integrated into the existing CDMA system, compatibility is not provided and interference occurs due to a difference between their transmission technologies.

In order to solve this problem, 3$^{rd}$ Generation Partnership Project (3GPP), an asynchronous CDMA standardization organization, considers a method for forming a forward link by allocating other frequency channels to the OFDMA system in addition to the existing CDMA system. However, such a method has a problem in that radio resources should be additionally allocated for the OFDMA system. Accordingly, there is a demand for a new mobile communication standard for providing compatibility between different communication technologies by using the advantages of the existing CDMA scheme and the OFDM scheme.

SUMMARY OF THE INVENTION

It is, therefore, an object of the present invention to provide a transmission/reception apparatus and method of a mobile communication system using Orthogonal Frequency Division Multiplexing (OFDM) is compatible with a Code Division Multiple Access (CDMA) mobile communication system in a forward link.

It is another object of the present invention to provide a mobile communication system supporting a traffic channel using OFDM in a CDMA mobile communication system.

It is further another object of the present invention to provide a transmission/reception apparatus and method of a mobile communication system using OFDM, for enabling transmission/reception of a pilot channel in a CDMA mobile communication system.

It is yet another object of the present invention to provide a transmission/reception apparatus and method of a mobile communication system using OFDM, for enabling transmission/reception of a sync channel in a CDMA mobile communication system.

It is still another object of the present invention to provide a transmission/reception apparatus and method of a mobile communication system capable of using a forward link including a pilot channel and a traffic channel transmitted by OFDM.

It is still another object of the present invention to provide a transmission/reception apparatus and method of a mobile communication system capable of using a forward link including a sync channel and a traffic channel transmitted by OFDM.

It is still another object of the present invention to provide a transmission/reception apparatus and method of a mobile communication system capable of using a forward link including a pilot channel, a sync channel, and a traffic channel transmitted by OFDM.

According to a first aspect of the present invention, there is provided a method for transmitting traffic data in a transmission apparatus for generating a pilot signal, spreading the pilot signal using a first channelization code, and generating a pilot channel signal having a predetermined chip rate by scrambling the spread pilot signal using a pseudo-random noise (PN) sequence in a mobile communication system. The method comprises the steps of generating an Orthogonal Frequency Division Multiplexing (OFDM) signal by modulating the traffic data using an OFDM scheme having the same sample rate as the predetermined chip rate; and summing the OFDM signal and the pilot channel signal, and transmitting the summed signal over one physical channel.

According to a second aspect of the present invention, there is provided a transmission apparatus in a mobile communication system. The transmission apparatus comprises a pilot channel signal generator for generating a pilot signal, spreading the pilot signal by a first channelization code, and generating a pilot channel signal having a predetermined chip rate by scrambling the spread pilot signal using a pseudo-random noise (PN) sequence; an Orthogonal Frequency Division Multiplexing (OFDM) signal generator for generating an OFDM signal by modulating traffic data using an OFDM scheme having the same sample rate as the predetermined chip rate; and a summer for summing up the OFDM signal and the pilot channel signal and transmitting the summed signal over one physical channel.

According to a third aspect of the present invention, there is provided a method for receiving an Orthogonal Frequency Division Multiplexing (OFDM) signal from a received signal in a reception apparatus for receiving a signal including an OFDM signal modulated by an OFDM scheme and a pilot channel signal in a mobile communication system. The method comprises the steps of descrambling the received signal using a pseudo-noise random (PN) sequence, despreading the descrambled signal using a first channelization code, and acquiring a pilot signal by demodulating the despread signal; spreading the pilot signal using the first channelization code, scrambling the spread pilot signal using the PN sequence, and generating a pilot channel signal having a predetermined chip rate by modulating the scrambled pilot signal; and subtracting the pilot channel signal from the received signal, and outputting a pure OFDM signal from which the pilot channel signal is removed.

According to a fourth aspect of the present invention, there is provided an apparatus for receiving an Orthogonal Frequency Division Multiplexing (OFDM) signal from a received signal in a mobile communication system for receiving a signal including an OFDM signal modulated using an OFDM scheme and a pilot channel signal. The apparatus comprises a pilot signal acquisition part for descrambling the received signal by a pseudo-noise random (PN) sequence, despreading the descrambled signal using a first channelization code, and acquiring a pilot signal by demodulating the despread signal; a pilot channel signal generator for spreading the pilot signal using the first channelization code, scrambling the spread pilot signal by the PN sequence, and generating a pilot channel signal having a predetermined chip rate by modulating the scrambled pilot signal; and a subtractor for subtracting the pilot channel signal from the received signal, and outputting a pure OFDM signal from which the pilot channel signal is removed.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will now be described in detail with reference to the accompanying drawings. In the following description, a detailed description of known functions and configurations incorporated herein has been omitted for conciseness.

In order to implement an embodiment of the present invention, a transmitter capable of transmitting a pilot signal and a sync signal together with an Orthogonal Frequency Division Multiplexing (OFDM) data signal is provided. Also, a receiver capable of separating a pilot signal and a sync signal from a received signal, and acquiring only a pure OFDM data signal by removing the pilot signal and the sync signal from the received signal is also provided. The pilot signal and the sync signal separated by the receiver can be used in an embodiment of the present invention.

With reference to the accompanying drawings, a detailed description will now be made of a transmitter and a receiver according to an embodiment of the present invention.

1. Transmitter

A transmitter according to an embodiment of the present invention should have a structure capable of transmitting traffic data by OFDMA in an existing Code Division Multiple Access (CDMA) transmitter.

Figure 1:
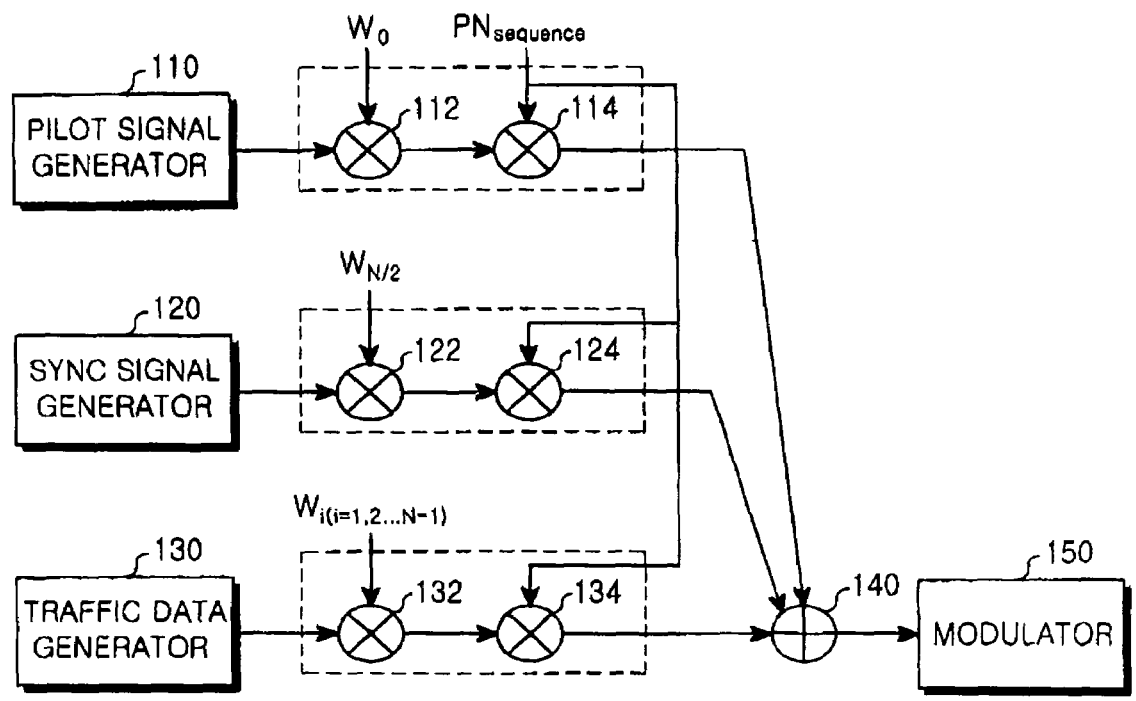
FIG. 1 is a block diagram illustrating a structure of a transmitter in a conventional Code Division Multiple Access (CDMA) mobile communication system.
Figure 2:
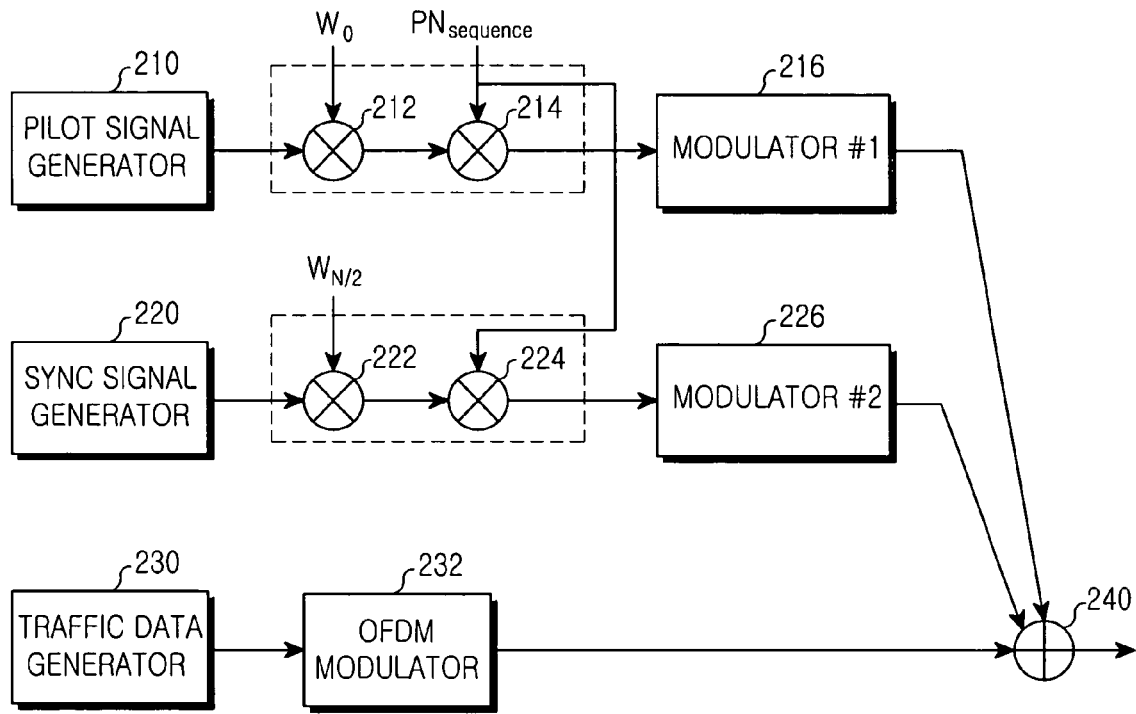
FIG. 2 is a block diagram illustrating a structure of a transmitter in a mobile communication system according to an embodiment of the present invention.

FIG. 2 is a block diagram illustrating a structure of a transmitter in an OFDMA mobile communication system according to an embodiment of the present invention. Referring to FIG. 2, a pilot signal generator 210 generates a pilot signal having a particular pattern which is already known to a transmitter and a receiver. It is assumed that the pilot signal was modulated by the pilot signal generator 210 using a predetermined modulation scheme. The modulation scheme includes 16-ary Quadrature Amplitude Modulation (16QAM), 64-ary Quadrature Amplitude Modulation (64QAM), and Quadrature Phase Shift Keying (QPSK). A first spreader 212 spreads the pilot signal from the pilot signal generator 210 with a channelization code $W_0$ for detecting a pilot channel. A first scrambler 214 scrambles the channel-spread pilot signal with a code (or PN sequence) for detecting a base station. The signal output from the first scrambler 214 is called a "pilot channel signal." The pilot channel signal is input to a first modulator 216, and the first modulator 216 modulates the pilot channel signal with a predetermined modulation scheme. The device for outputting the pilot channel signal is called a "pilot channel signal generator."

A sync signal generator 220 generates a sync signal for matching synchronization between a transmitter and a receiver. It is assumed that the sync signal was modulated by the sync signal generator 220 using a predetermined modulation scheme. The modulation scheme is identical to the modulation scheme used for modulation of the pilot signal. A second spreader 222 spreads the sync signal from the sync signal generator 220 with a channelization code $W_{N/2}$ for detecting a sync channel. Here, N denotes the total number of channelization codes to be used in the CDMA mobile communication system. Commonly, a Walsh code $W_{16}$ is used as a channelization code for detecting the sync channel. A second scrambler 224 scrambles the channel-spread sync signal with a code (or PN sequence) for detecting a base station. The signal output from the second scrambler 224 is called a "sync channel signal." The sync channel signal is input to a second modulator 226, and the second modulator 226 modulates the sync channel signal with a predetermined modulation scheme. The device for outputting the sync channel signal is called a "sync channel signal generator."

A traffic data generator 230 generates data to be transmitted over a traffic channel. An OFDM modulator 232 modulates the traffic data using OFDM, and outputs OFDM-modulated symbols. The OFDM modulation is achieved by grouping transmission data $X_k$ by the M bits and performing Inverse Fast Fourier Transform (IFFT) thereon. Here, M denotes the number of subcarriers input to the IFFT. The IFFT can be expressed as $$X_n = \sum_{k=0}^{M-1} X_k e^{j\frac{2\pi nk}{M}} \tag{1}$$

The pilot channel signal from the first scrambler 214, the sync channel signal from the second scrambler 224, and the OFDM-modulated symbols $X_n$ from the OFDM modulator 232 are input to a summer 240. The summer 240 sums up the pilot channel signal, the sync channel signal and the OFDM-modulated symbols in a time domain, and transmits one output signal to a receiver. That is, the spread pilot channel signal and sync channel signal are added to the traffic channel which was modulated without being spread. For the summation in a time domain, a chip rate of the pilot channel signal and the sync channel signal should be identical to a sample rate of the OFDM-modulated signal. For example, if a chip rate of the pilot channel signal and the sync channel signal is 1.2288 MHz, a sample rate of the OFDM-modulated signal should also become 1.2288 MHz.

Figure 4:
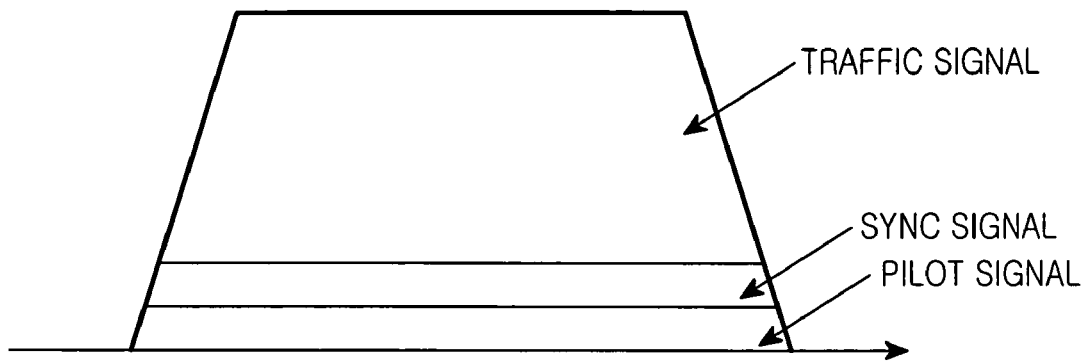
FIG. 4 is a diagram illustrating a frequency spectrum of a forward link signal according to an embodiment of the present invention.
Figure 5:
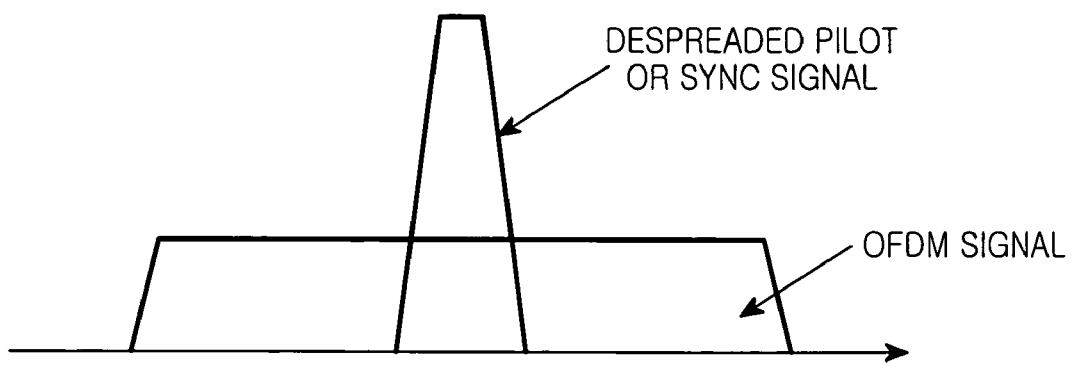
FIG. 5 is a diagram illustrating a spectrum of a despread signal according to an embodiment of the present invention.
Figure 6:
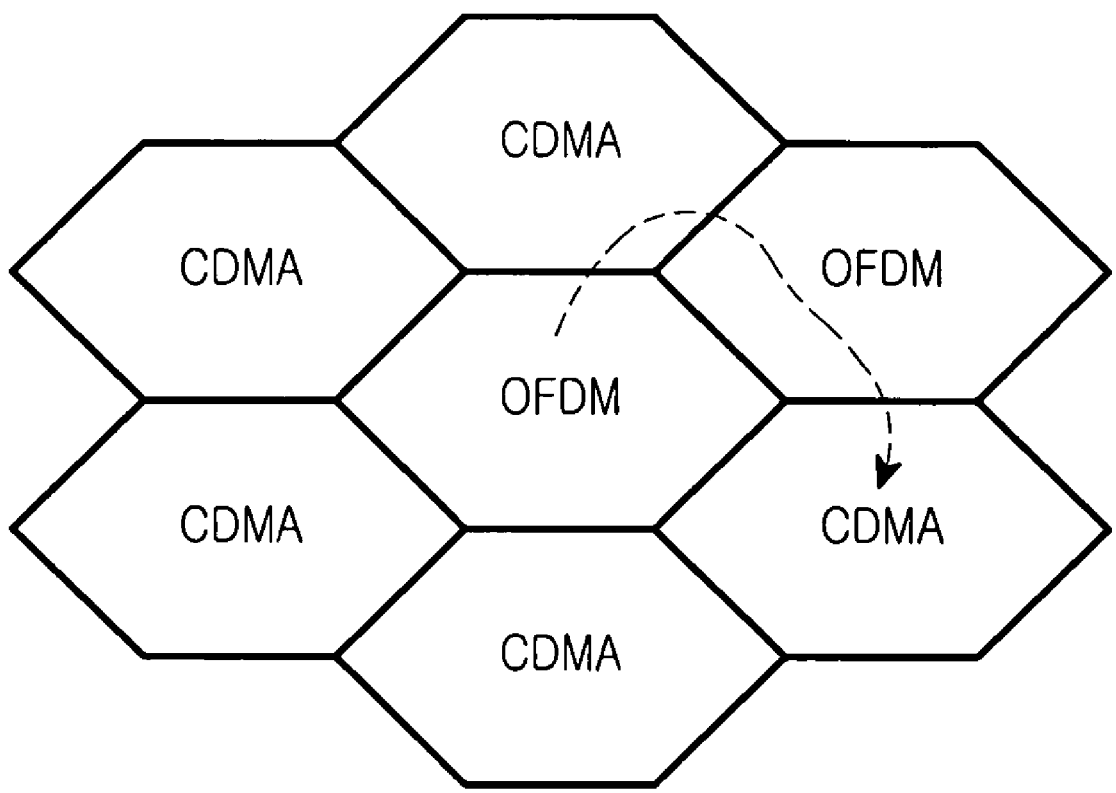
FIG. 6 is a diagram illustrating a mobile communication network configuration in which CDMA cells coexist with Orthogonal Frequency Division Multiplexing (OFDM) cells.

FIG. 4 is a diagram illustrating a frequency spectrum for a signal obtained by summing a pilot channel signal, a sync channel signal and a traffic channel signal by the transmitter described above. If a pilot channel signal, a sync channel signal and an OFDM signal coexist in one radio channel as illustrated in FIG. 4, interference occurs between them. In this case, because the pilot channel signal and the sync channel signal were spread by corresponding Walsh codes and a PN sequence, they are lower in power level than the OFDM signal. However, if a receiver performs despreading on the signals, a power level of the pilot channel signal and the sync channel signal increases $N^2$ times, so it is higher than that of the OFDM signal. Therefore, the receiver cannot demodulate the pilot channel signal and the sync channel signal. A signal spectrum after the receiver despreads received signals is illustrated in FIG. 5.

2. Receiver

With reference to the accompanying drawings, a detailed description will now be made of an operation performed in a receiver for an OFDM mobile communication system according to an embodiment of the present invention.

When an OFDM-modulated signal, or a traffic channel, is demodulated according to an embodiment of the present invention, a pilot channel signal and a sync channel signal should be removed, because the pilot channel signal and the sync channel signal cause interference. Therefore, a receiver according to an embodiment of the present invention should have a structure for separating a pilot channel signal from a received signal and removing a pilot channel signal component included in the received signal using the pilot channel signal. Also, the receiver should have a structure for separating a sync channel signal from the received signal and removing a sync channel signal component included in the received signal using the sync channel signal.

Figure 3:
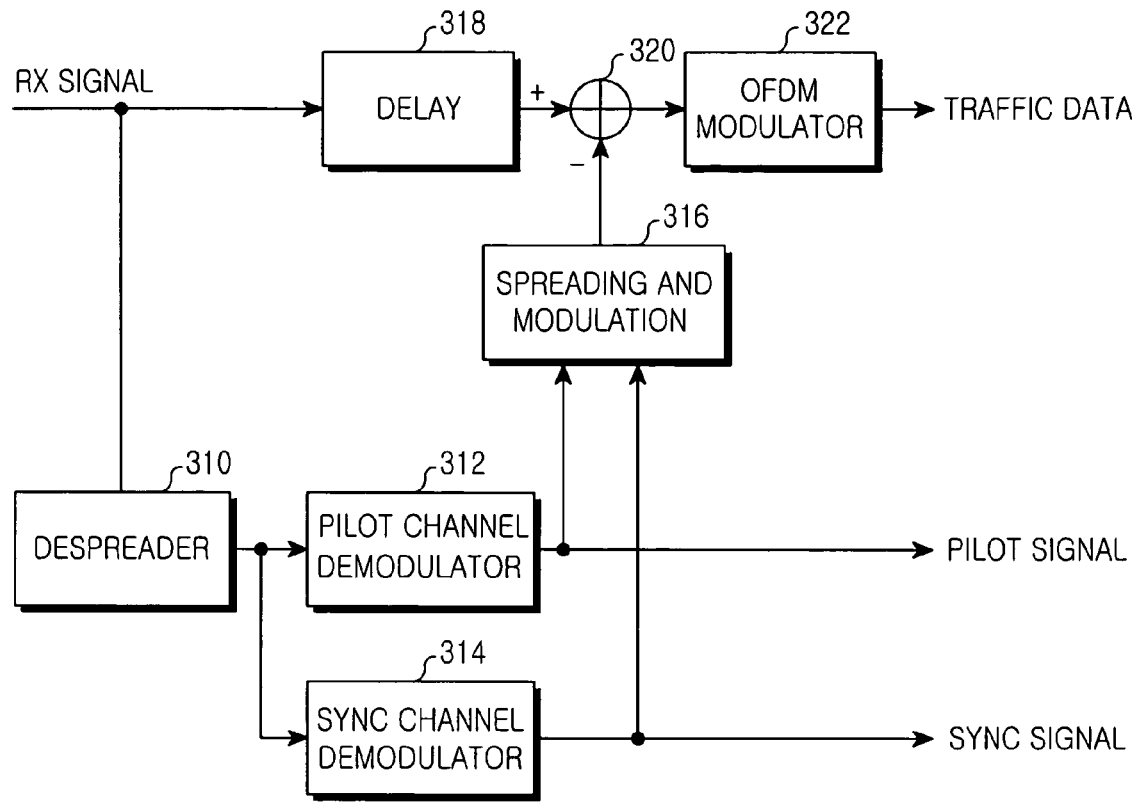
FIG. 3 is a block diagram illustrating a structure of a receiver in a mobile communication system according to an embodiment of the present invention.

FIG. 3 is a block diagram illustrating a structure of a receiver in an OFDM mobile communication system according to an embodiment of the present invention. Referring to FIG. 3, a signal received from a transmitter is input to a despreader 310. The received signal can be expressed as $$r_n = x_n + x_{pilot} + x_{sync} \quad (2)$$

Here, $r_n$ denotes a received signal, $x_n$ denotes an OFDM signal, $x_{pilot}$ denotes a pilot channel signal, and $x_{sync}$ denotes a sync channel signal.

The despreader 310 comprises a first structure for acquiring a pilot channel signal from the received signal and a second structure for acquiring a sync channel signal from the received signal. The despreader 310 descrambles the received signal with a predetermined PN sequence for detecting a base station. The descrambling by a PN sequence can be simultaneously performed on a pilot channel signal and a sync channel signal by a single multiplier, or can be separately performed by separate multipliers. The descrambled signals are despread by a channelization code for a pilot channel and a channelization code for a sync channel, respectively. A $0^{th}$ Walsh code $W_0$ can be used as the channelization code for a pilot channel, and an $(N/2)^{th}$ Walsh code $W_{N/2}$ can be used as the channelization code for a sync channel. The pilot channel signal from the despreader 310 is input to a pilot channel demodulator 312 where it is demodulated into a pilot signal. The sync channel signal from the despreader 310 is input to a sync channel demodulator 314 where it is demodulated into a sync signal. The pilot signal and the sync signal can be used for the same purpose as that in the existing CDMA mobile communication system.

The pilot signal and the sync signal are input to a spreading and modulation part 316. The spreading and modulation part 316 corresponds to the pilot channel signal generator and the sync channel signal generator in the transmitter. Therefore, the pilot signal, by the spreading and modulation part 316, is spread with the channelization code for a pilot channel, scrambled with the PN sequence, and then output as a pilot channel signal $\hat{x}_{pilot}$. Also, the sync signal, by the spreading and modulation part 316, is spread with the channelization code for a sync channel, scrambled with the PN sequence, and then output as a sync channel signal $\hat{x}_{sync}$. The first structure for acquiring the pilot channel signal $\hat{x}_{pilot}$ and the pilot channel demodulator 312 constitute a "pilot signal acquisition part." The second structure for acquiring the sync channel signal $\hat{x}_{sync}$ and the sync channel demodulator 314 constitute a "sync signal acquisition part."

The received signal is delayed by a delay 318 for a desired time until the pilot channel signal $\hat{x}_{pilot}$ and the sync channel signal $\hat{x}_{sync}$ are output. The delayed received signal $x_n$ is input to a subtractor 320. Also, the pilot channel signal $\hat{x}_{pilot}$ and the sync channel signal $\hat{x}_{sync}$ are input to the subtractor 320. Therefore, the subtractor 320 subtracts the pilot channel signal $\hat{x}_{pilot}$ and the sync channel signal $\hat{x}_{sync}$ from the delayed received signal $x_n$. The subtraction is expressed as $$\hat{r}_n = x_n + (x_{pilot} - \hat{x}_{pilot}) + (x_{sync} - \hat{x}_{sync}) \quad (3)$$

The signal expressed with Equation (3) can be regarded as an OFDM signal modulated by OFDM. The OFDM signal is input to an OFDM demodulator 322 where it is OFDM-demodulated and then output as traffic data. The OFDM demodulation is achieved by grouping OFDM symbols by the M symbols (where M denotes the number of subcarriers input to FFT) and performing FFT thereon in accordance with Equation (4), thereby restoring desired data $X_k$.

$$X_k = \sum_{n=0}^{M-1} x_n e^{-j\frac{2\pi k n}{M}} \quad (4)$$

In Equation (4), $x_n$ corresponds to $\hat{r}_n$ calculated by Equation (3), and M denotes the number of subcarriers input to FFT.

As described above, the embodiment of the present invention allows a traffic channel to use OFDM while maintaining a pilot channel and a sync channel in the existing CDMA mobile communication system, thereby proving both the advantages of the CDMA scheme and the advantages of the OFDM scheme. The embodiment of the present invention has the following advantages.

First, the embodiment of the present invention contributes to an increase in data transmission efficiency and compatibility.

Second, the use of the OFDM scheme can remove possible inefficiency caused by allocating a Walsh code to a traffic channel to transmit packets with various lengths in the existing CDMA scheme. That is, it is possible to freely transmit a packet with a very short length and a packet with a very long length.

Third, transmission power of each channel can also be freely controlled according to the advantages of the OFDM scheme.

Fourth, the use of the pilot channel and the sync channel can take full advantage of initial synchronization, simple cell planning, soft handover, and system time-based transmission characteristics of the existing synchronous CDMA mobile communication system.

While the invention has been shown and described with reference to a certain embodiment thereof, it should be understood by those skilled in the art that various changes in form and details may be made therein without departing from the spirit and scope of the invention as defined by the appended claims.

What is claimed is:

1. A method for transmitting traffic data in a transmission apparatus for generating a pilot signal, spreading the pilot signal using a first channelization code, and generating a pilot channel signal having a predetermined chip rate by scrambling the spread pilot signal using a pseudo-random noise (PN) sequence in a mobile communication system, the method comprising the steps of:

generating an Orthogonal Frequency Division Multiplexing (OFDM) signal by modulating the traffic data having the same sample rate as the predetermined chip rate;

summing the OFDM signal and the pilot channel signal, and transmitting the summed signal; and spreading the sync signal using a second channelization code, generating a sync channel signal having the predetermined chip rate by scrambling the spread sync signal using the PN sequence, and summing the sync channel signal, the OFDM signal and the pilot channel signal.

2. The method of claim 1, wherein the summed signal is transmitted over one physical channel.

3. The method of claim 1, wherein the chip rate is substantially 1.2288 MHz.

4. The method of claim 1, wherein the first channelization code comprises a $0^{th}$ Walsh code $W_0$, and the second channelization code comprises an $(N/2)^{th}$ Walsh code $W_{N/2}$, and the N is total number of Walsh code.

5. A transmission apparatus in a mobile communication system, comprising:

a pilot channel signal generator for generating a pilot signal, spreading the pilot signal using a first channelization code, and generating a pilot channel signal having a predetermined chip rate by scrambling the spread pilot signal using a pseudo-random noise (PN) sequence;

an Orthogonal Frequency Division Multiplexing (OFDM) signal generator for generating an OFDM signal by modulating traffic data having the same sample rate as the predetermined chip rate;

a summer for summing the OFDM signal and the pilot channel signal and transmitting the summed signal; and a sync channel signal generator for generating a sync signal, spreading the sync signal using a second channelization code, and generating a sync channel signal having the predetermined chip rate by scrambling the spread sync signal using the PN sequence, wherein the summer sums the sync channel signal, the OFDM signal and the pilot channel signal.

6. The transmission apparatus of claim 5, wherein the summed signal is transmitted over one physical channel.

7. The transmission apparatus of claim 5, where in the chip rate is substantially 1.2288 MHz.

8. The transmission apparatus of claim 5, wherein the first channelization code comprises a $0^{th}$ Walsh code $W_0$, and the second channelization code comprises an $(N/2)^{th}$ Walsh code $W_{N/2}$, and the N is total number of Walsh code.

9. The transmission apparatus of claim 7, wherein the pilot channel signal generator comprises:

a pilot signal generator for generating the pilot signal;

a first spreader for spreading the pilot signal generated by the pilot signal generator with a channelization code for detecting a pilot channel;

a first scrambler for scrambling the channel-spread pilot signal with a PN sequence for detecting a base station; and a first modulator for modulating the pilot channel signal with a predetermined modulation scheme and outputting a modulated pilot channel signal.

10. The transmission apparatus of claim 5, wherein the sync channel signal generator comprises:

a sync signal generator for generating the sync signal for matching synchronization between a transmitter and a receiver;

a second spreader for spreading the sync signal generated by the sync signal generator with a channelization code for detecting a sync channel;

a second scrambler for scrambling the channel-spread sync signal with a PN sequence for detecting a base station; and a second modulator for modulating the sync channel signal with a predetermined modulation scheme and outputting a modulated sync channel signal.

11. A method for receiving an Orthogonal Frequency Division Multiplexing (OFDM) signal from a received signal in a reception apparatus for receiving a signal including an OFDM signal modulated and a pilot channel signal in a mobile communication system, the method comprising the steps of:

descrambling the received signal using a pseudo-noise random (PN) sequence, despreading the descrambled signal using a first channelization code, and acquiring a pilot signal by demodulating the despread signal;

spreading the pilot signal using the first channelization code, scrambling the spread pilot signal by the PN sequence, and generating a pilot channel signal having a predetermined chip rate by modulating the scrambled pilot signal;

subtracting the pilot channel signal from the received signal, and outputting a pure OFDM signal from which the pilot channel signal is removed; and descrambling the received signal using a PN sequence, despreading the descrambled signal using a second channelization code, and acquiring a sync signal by demodulating the despread signal;

spreading the sync signal using the second channelization code, scrambling the spread sync signal using the PN sequence, and generating a sync channel signal having the predetermined chip rate by modulating the scrambled sync signal; and subtracting the sync channel signal from the received signal from which the pilot channel signal is removed, and outputting an OFDM signal from which the pilot channel signal and the sync channel signal are removed.

12. The method of claim 11, wherein the chip rate is substantially 1.2288 MHz.

13. The method of claim 12, wherein the OFDM signal has the same sample rate as the chip rate.

14. The apparatus of claim 13, wherein the first channelization code comprises a $0^{th}$ Walsh code $W_0$, and the second channelization code comprises an $(N/2)^{th}$ Walsh code $W_{N/2}$, and the N is total number of Walsh code.

15. The method of claim 11, wherein the first channelization code comprises a $0^{th}$ Walsh code $W_0$, and the second channelization code comprises an $(N/2)^{th}$ Walsh code $W_{N/2}$, and the N is total number of Walsh code.

16. An apparatus for receiving an Orthogonal Frequency Division Multiplexing (OFDM) signal from a received signal in a mobile communication system for receiving a signal including an OFDM signal modulated and a pilot channel signal, the apparatus comprising:

a pilot signal receiver for descrambling the received signal using a pseudo-noise random (PN) sequence, despreading the descrambled signal using a first channelization code, and acquiring a pilot signal by demodulating the despread signal;

a pilot channel signal generator for spreading the pilot signal using the first channelization code, scrambling the spread pilot signal using the PN sequence, and generating a pilot channel signal having a predetermined chip rate by modulating the scrambled pilot signal;

a first subtractor for subtracting the pilot channel signal from the received signal, and outputting a pure OFDM signal from which the pilot channel signal is removed; and a sync signal receiver for descrambling the received signal using a PN sequence, despreading the descrambled signal using a second channelization code, and acquiring a sync signal by demodulating the despread signal;

a sync channel signal generator for spreading the sync signal using the second channelization code, scrambling the spread sync signal using the PN sequence, and generating a sync channel signal having the predetermined chip rate by modulating the scrambled sync signal; and a second subtractor for subtracting the sync channel signal from the received signal from which the pilot channel signal is removed, and outputting an OFDM signal from which the pilot channel signal and the sync channel signal are removed.

17. The apparatus of claim 16, wherein the chip rate is substantially 1.2288 MHz.

18. The apparatus of claim 17, wherein the OFDM signal has the same sample rate as the chip rate.

19. The apparatus of claim 16, further comprising an OFDM demodulator for demodulating the OFDM signal output from the first subtractor and the second subtractor and outputting the demodulated OFDM signal as traffic data.

20. The apparatus of claim 16, wherein the pilot signal receiver comprises:

a despreader for descrambling the received signal using a PN sequence, and despreading the descrambled signal using a first channelization code; and a pilot channel demodulator for demodulating the despread signal and outputting a pilot signal.

21. The apparatus of claim 16, wherein the sync signal receiver comprises:

a despreader for descrambling the received signal using a PN sequence, and despreading the descrambled signal using a second channelization code; and a sync channel demodulator for demodulating the despread signal and outputting a sync signal.

* * * * *